US010795792B2

(12) United States Patent
Savino et al.

(10) Patent No.: US 10,795,792 B2
(45) Date of Patent: Oct. 6, 2020

(54) METHODS, APPARATUSES AND SYSTEMS FOR CLOUD-BASED DISASTER RECOVERY TEST

(71) Applicant: Storage Engine, Inc., Tinton Falls, NJ (US)

(72) Inventors: Trevor Savino, Seymour, CT (US); James Patrick Hart, Brick, NJ (US); Justin Furniss, Egg Harbor City, NJ (US)

(73) Assignee: Storage Engine, Inc., Tinton Falls, NJ (US)

( * ) Notice: Subject to any disclaimer, the term of this patent is extended or adjusted under 35 U.S.C. 154(b) by 252 days.

(21) Appl. No.: 15/887,032

(22) Filed: Feb. 2, 2018

(65) Prior Publication Data

US 2019/0243737 A1    Aug. 8, 2019

(51) Int. Cl.
*G06F 11/26* (2006.01)
*G06F 11/22* (2006.01)
*H04L 12/24* (2006.01)

(52) U.S. Cl.
CPC ........ *G06F 11/261* (2013.01); *G06F 11/2215* (2013.01); *G06F 11/2289* (2013.01); *H04L 41/147* (2013.01)

(58) Field of Classification Search
CPC ............. G06F 11/1425; G06F 11/1446; G06F 11/1464; G06F 11/2033; G06F 11/2215; G06F 11/2289; G06F 11/261; G06F 2009/45562; G06F 2009/45591; H04L 41/147; H04L 43/50; H04L 69/40
See application file for complete search history.

(56) References Cited

U.S. PATENT DOCUMENTS

| 8,639,793 | B2 | 1/2014 | Kapur et al. | |
|---|---|---|---|---|
| 9,860,208 | B1* | 1/2018 | Ettema | G06F 21/602 |
| 9,946,619 | B1* | 4/2018 | McClintock | G06F 11/1464 |
| 2005/0171752 | A1* | 8/2005 | Patrizio | G06F 11/261 |
| | | | | 703/17 |
| 2008/0271019 | A1* | 10/2008 | Stratton | G06F 21/577 |
| | | | | 718/1 |

(Continued)

OTHER PUBLICATIONS

International Search Report and Written Opinion dated May 3, 2019 for Application No. PCT/US2019/015652, 11 pages.

*Primary Examiner* — Gabriel Chu
(74) *Attorney, Agent, or Firm* — Moser Taboada

(57) ABSTRACT

A method, apparatus and system for providing a cloud-based disaster recovery test include receiving, at a cloud-based computing platform, a request for a disaster recovery test of at least a portion of a client's data network, in response to the received request, creating an isolated network in the cloud-based computing platform, cloning, in the isolated network, machines and configurations of the at least the portion of the client's data network to be included in the cloud-based disaster recovery test, reserving resources of the cloud-based computing platform based on the cloned machines and configurations of the at least the portion of the client's data network and an associated data handler to be deployed in the cloud-based disaster recovery test, and enabling the cloned machines for use by the client for performing the cloud-based disaster recovery test in the cloud-based computing platform.

20 Claims, 9 Drawing Sheets

(56) References Cited

U.S. PATENT DOCUMENTS

| | | | |
|---|---|---|---|
| 2011/0161730 A1* | 6/2011 | Van Der Merwe | ........................ G06F 11/3636 714/15 |
| 2011/0258481 A1 | 10/2011 | Kern | |
| 2012/0144236 A1* | 6/2012 | Black | ................... H04L 41/145 714/25 |
| 2012/0324281 A1* | 12/2012 | Goroff | ................ G06F 11/2215 714/15 |
| 2013/0111260 A1 | 5/2013 | Reddy et al. | |
| 2013/0139128 A1* | 5/2013 | Jones | ................... G06F 11/366 717/128 |
| 2013/0262390 A1 | 10/2013 | Kumarasamy et al. | |
| 2014/0196038 A1 | 7/2014 | Kottomtharayil et al. | |
| 2015/0324260 A1* | 11/2015 | Mutalik | .............. G06F 9/45558 714/703 |
| 2017/0199808 A1* | 7/2017 | Campbell | ........... G06F 11/3664 |
| 2018/0314625 A1* | 11/2018 | Schuller | .............. G06F 11/3664 |

\* cited by examiner

CLONE KEEP ALIVE NETWORK(S)

| LABEL | TYPE | DESCRIPTION | PROVIDED BY |
|---|---|---|---|
| Edge Service Gateway Configuration | JSON | ESG Configuration JSON | NSX |
| Distributed Logical Router Configuration | JSON | DLR Configuration JSON | NSX |
| ESG to DLR Logical Switch Configuration | JSON | ESG to DLR LS Configuration | NSX |
| VM Logical Switch Configuration | JSON | The logical switch configuration the VM's attach to | NSX |
| Uplink Private IP's | Array | During the deployment, the uplink "Public" and "Private" IP's MUST be changed to prevent IP conflicts. The internal IP of the ESG going to the DLR will remain the same | SCM |
| Uplink Private IP's | Array | During the deployment, the uplink "Public" and "Private" IP's MUST be changed to prevent IP conflicts. The internal IP of the ESG going to the DLR will remain the same | SCM |
| SSL VPN Configuration | JSON | Pull from the existing ESG Configuration | NSX |

FIG. 3

CLONE "KEEP ALIVE" VIRTUAL MACHINES

| LABEL | TYPE | DESCRIPTION | PROVIDED BY |
|---|---|---|---|
| Name/UUID/VMID of the VM(s) to be cloned | String/Array | Identifiers for the VM to be cloned | SCM |
| Name of Cloned VM | String/Array | The names to be given to the cloned VM | SCM |
| VM OS | String/Array | The Guest OS running on the VM | SCM |
| Resource Pool Name | String/Array | Names of the Resource Pool the Cloned VM will be placed on | SCM |
| Host Name | String/Array | Names of the Host the Cloned VM will be placed on | SCM |
| VM Folder Name | String/Array | Names of the Folders the Cloned VM will be moved to in vCenter | SCM |
| Datastore Name | String/Array | Names of the Datastore that the VMDK's of the Cloned VM's will be placed on | SCM |
| VM Network Adapter MAC Address | String | The MAC address of a network adapter. If the MAC address is not included, the customization process maps the settings from the VM's network adapters, in PCI order | SCM |

FIG. 6A

| | | | |
|---|---|---|---|
| Network that will attach to the Virtual Network Interface | String | Network that will attach to the Virtual Network Interface | SCM |
| Use DHCP | Boolean | Use a DHCP server to configure the Virtual Network Adapter | SCM |
| Fixed, valid IP address | String | A fixed, valid IP address that is to be assigned to the Virtual Network Adapter for the VM | SCM |
| Subnet Mask | String | The subnet mask for the VM's Virtual Network Adapter | SCM |
| List of Gateways | Array | A list of Network Gateways to be used, in order of preference | SCM |
| DNS Domain Suffix | String | Example: vmware.com | SCM |
| DNS Servers List | Array | List of DNS Servers for a Virtual Network Adapter with a Static IP address | SCM |

FIG. 6B

RENAME VIRTUAL MACHINE

| LABEL | TYPE | DESCRIPTION | PROVIDED BY |
|---|---|---|---|
| Current VM Name or vmid | String | The name or vmid of the Virtual Machine that is to be renamed | SCM |
| New VM Name | String | The new name that will be given to the Virtual Machine | SCM |

TAG VIRTUAL MACHINE

| LABEL | TYPE | DESCRIPTION | PROVIDED BY |
|---|---|---|---|
| VM Name or vmid | String | The name or vmid of the Virtual Machine that will be Tagged | SCM |
| Tag Category Name | String | The name of the Tag Category containing the Tag(s) that are to be assigned | SCM |
| Tag Name | String | Name of the Tag that is to be assigned | SCM |

MOVE VIRTUAL MACHINE TO FOLDER

| LABEL | TYPE | DESCRIPTION | PROVIDED BY |
|---|---|---|---|
| List of VM Names or vmid's | Array/String | The array containing the names or vmid's of the VM's that need to be moved to a Folder | SCM |
| Folders | Array/String | The name of the Folders that the VM's will be moved to | SCM |

FIG. 7A

IMPORT VIRTUAL MACHINE INTO vRA

| LABEL | TYPE | DESCRIPTION | PROVIDED BY |
|---|---|---|---|
| VM | String | The name or vmid of the Virtual Machine that will be imported from vCenter into vRA | SCM |
| vRA Host | String | The vRA instance the VM will be imported to | SCM |
| vRA Reservation | String | Name of the Reservation that the VM will be imported under | SCM |
| VM Owner | String | vRA Username of the User the VM will be assigned to once the VM has been imported into vRA | SCM |
| Identity User | String | Must be a valid username in vRA. The vRO workflow requires that "identityUser" is a user with rights to perform the Registration. Perhaps use the Service Account | SCM |
| Composite Blueprint Name | String | Name of the Composite Blueprint the VM will be imported under | SCM |
| Composite Blueprint Component Name | String | Name of the Composite Blueprint Component | SCM |
| Deployment Name | String | The name to be given to the imported VM | SCM |

FIG. 7B

METHODS, APPARATUSES AND SYSTEMS FOR CLOUD-BASED DISASTER RECOVERY TEST

FIELD

Embodiments of the present principles generally relate to methods, apparatuses and systems for providing a disaster recovery test and a more specifically to methods, apparatuses and systems for providing a cloud-based disaster recovery test of client data, machines and networks.

BACKGROUND

Organizations are increasingly searching for and analyzing solutions that will protect their data and increase their business service recovery time in the event of disruption to their IT infrastructure. Disruption events can be caused by weather related catastrophes and/or unexpected infrastructure outages and possibly even acts of bad intent. Choosing an appropriate solution can be a very expensive and time consuming process that can add years of delay to the actual deployment of a Disaster Recovery (DR) plan. Even further, once a Disaster Recovery plan has been instituted it is difficult to be sure that the Disaster Recovery plan and components will operate correctly in the event of a catastrophe.

Some Disaster Recovery solutions include having duplicates of at least some if not all machines of a network. To test the Disaster Recovery solution, the primary machines are taken off line and the duplicate machines are implemented in place of the primary machines. Such testing, however, requires the interruption of the primary network or the testing must be done in a vat that does not fully replicate the steps required in an actual Disaster Some other Disaster Recovery test solutions provide an evaluation environment which includes similar hardware as the original network to evaluate the effectiveness of a Disaster Recovery solution. A drawback of building such a custom test environment for evaluations is the hardware expense and the number of teams required in the effort and the coordination required to design and implement a successful project. A typical evaluation project requires networking, server, operating system, storage, virtualization and service management equipment and expertise. That is, a significant problem with creating a successful evaluation project is the difficulty in realizing a solution quickly based on the complexity of the setup (spanning multiple sites) and the number or organizations required to oversee the environment.

There is a need to be able to provide a Disaster Recovery test of a network without the expense of having to maintain and manage a duplicate evaluation system or to interrupt a primary site.

SUMMARY

Embodiments of methods, apparatuses and systems for providing a cloud-based disaster recovery test are disclosed herein.

In some embodiments, a method for providing a cloud-based disaster recovery test includes receiving, at a cloud-based computing platform, a request for a disaster recovery test of at least a portion of a client's data network, in response to the received request, creating an isolated network in the cloud-based computing platform, cloning, in the isolated network, machines and configurations of the at least the portion of the client's data network to be included in the cloud-based disaster recovery test, reserving resources of the cloud-based computing platform based on the cloned machines and configurations of the at least the portion of the client's data network and an associated data handler to be deployed in the cloud-based disaster recovery test, and enabling the cloned machines for use by the client for performing the cloud-based disaster recovery test in the cloud-based computing platform.

In some embodiments, the method can further include cloning, in the isolated network, virtual machines of the at least the portion of the client's data network to be included in the cloud-based disaster recovery test and enabling all cloned virtual machines as a virtual data network in the cloud-based computing platform for use by the client for performing the cloud-based disaster recovery test.

In some embodiments, the method can further include receiving an indication of a recovery point at which to perform the cloud-based disaster recovery test, in response to receiving the indication of the recovery point, retrieving data associated with the cloned machines at the recovery point from a storage means having a backup copy of such data, and provisioning the cloned machines with the retrieved data for performing the cloud-based disaster recovery test in the cloud-based computing platform.

In some embodiments, a cloud-based server of a cloud-based computing platform for providing a cloud-based disaster recovery test includes a processor and a memory coupled to the processor. In some embodiments, the memory has stored therein at least one of programs or instructions executable by the processor to configure the cloud-based server to receive, at a cloud-based computing platform, a request for a disaster recovery test of at least a portion of a client's data network, in response to the received request, create an isolated network in the cloud-based computing platform, clone, in the isolated network, machines and configurations of the at least the portion of the client's data network to be included in the cloud-based disaster recovery test, reserve resources of the cloud-based computing platform based on the cloned machines and configurations of the at least the portion of the client's data network and an associated data handler to be deployed in the cloud-based disaster recovery test, and enable the cloned machines for use by the client for performing the cloud-based disaster recovery test in the cloud-based computing platform.

In some embodiments, the cloud-based server is further configured to clone, in the isolated network, virtual machines of the at least the portion of the client's data network to be included in the cloud-based disaster recovery test and enable all cloned virtual machines as a virtual data network in the cloud-based computing platform for use by the client for performing the cloud-based disaster recovery test. In such embodiments the cloud-based server can be further configured to receive an indication of a recovery point at which to perform the cloud-based disaster recovery test, in response to receiving the indication of the recovery point, retrieve data associated with the cloned machines at the recovery point from a storage means having a backup copy of such data, and provision the cloned machines with the retrieved data for performing the cloud-based disaster recovery test in the cloud-based computing platform.

In some embodiments, the cloud-based server further includes data handler software for managing data transmissions in the isolated network in the cloud-based computing platform and a web-based application for communicating with clients In some embodiments, a cloud-based computing platform for providing a cloud-based disaster recovery test includes a storage device to store at least one of backup data or configuration information and a cloud-based server including a processor and a memory coupled to the processor. In some embodiments, the memory has stored therein at least one of programs or instructions executable by the processor to configure the cloud-based server to receive, at a cloud-based computing platform, a request for a disaster recovery test of at least a portion of a client's data network, in response to the received request, create an isolated network in the cloud-based computing platform, clone, in the isolated network, machines and configurations of the at least the portion of the client's data network to be included in the cloud-based disaster recovery test, reserve resources of the cloud-based computing platform based on the cloned machines and configurations of the at least the portion of the client's data network and an associated data handler to be deployed in the cloud-based disaster recovery test, and enable the cloned machines for use by the client for performing the cloud-based disaster recovery test in the cloud-based computing platform.

In some embodiments, the cloud-based server of the cloud-based computing platform is further configured to clone, in the isolated network, virtual machines of the at least the portion of the client's data network to be included in the cloud-based disaster recovery test and enable all cloned virtual machines as a virtual data network in the cloud-based computing platform for use by the client for performing the cloud-based disaster recovery test. In such embodiments the cloud-based server can be further configured to receive an indication of a recovery point at which to perform the cloud-based disaster recovery test, in response to receiving the indication of the recovery point, retrieve data associated with the cloned machines at the recovery point from a storage means having a backup copy of such data, and provision the cloned machines with the retrieved data for performing the cloud-based disaster recovery test in the cloud-based computing platform.

In some embodiments, the cloud-based server of the cloud-based computing platform is further configured to receive an indication of a recovery point at which to perform the cloud-based disaster recovery test, in response to receiving the indication of the recovery point, retrieve data associated with the cloned machines at the recovery point from a storage means having a backup copy of such data, and provision the cloned machines with the retrieved data for performing the cloud-based disaster recovery test in the cloud-based computing platform.

Other and further embodiments of the present principles are described below.

BRIEF DESCRIPTION OF THE DRAWINGS

Embodiments of the present principles, briefly summarized above and discussed in greater detail below, can be understood by reference to the illustrative embodiments of the principles depicted in the appended drawings. However, the appended drawings illustrate only typical embodiments of the present principles and are therefore not to be considered limiting of scope, for the present principles may admit to other equally effective embodiments.

FIG. 3 depicts a table including examples of machines and associated configuration information of an identified "keep alive" network(s) which can be provided for cloning the machines and configurations.

FIGS. 6A and 6B depict a table providing examples of types of information that can be provided for cloning a respective virtual machine(s) included in a client's identified "keep alive" network(s) in accordance with an embodiment of the present principles.

FIG. 7A depicts tables providing examples of inputs and information required for renaming, tagging and moving to a folder a virtual machine(s) and a source of the inputs and information in accordance with an embodiment of the present principles.

FIG. 7B depicts a table providing examples of inputs and information required for importing a virtual machine to a vRA and a source of the inputs and information in accordance with an embodiment of the present principles.

Figure 1:
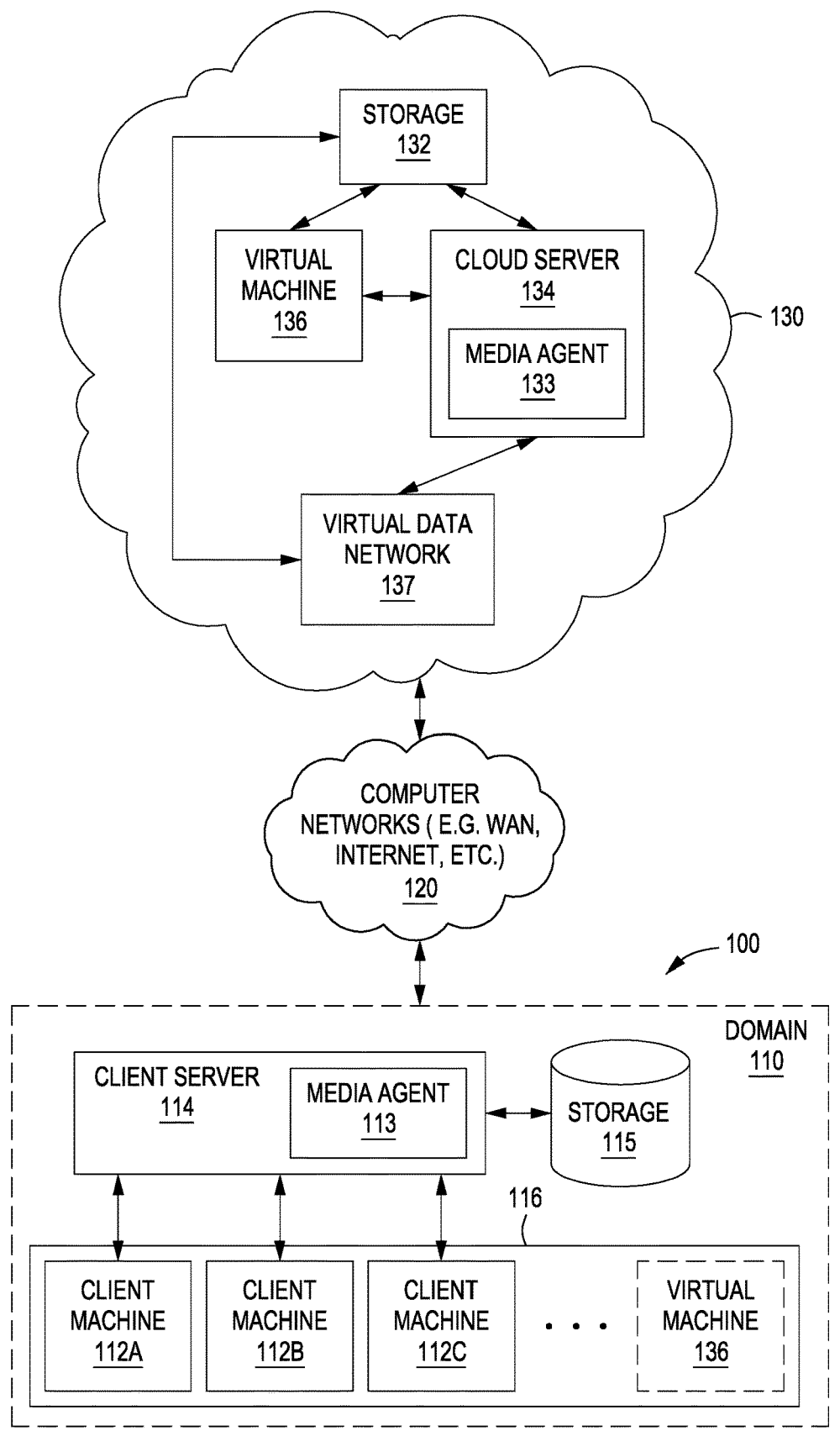
FIG. 1 depicts a high level block diagram of a cloud-based disaster recovery and data backup system for providing a cloud-based disaster recovery test in accordance with an embodiment of the present principles.

To facilitate understanding, identical reference numerals have been used, where possible, to designate identical elements that are common to the figures. The figures are not drawn to scale and may be simplified for clarity. Elements and features of one embodiment may be beneficially incorporated in other embodiments without further recitation.

DETAILED DESCRIPTION

In the following detailed description, numerous specific details are set forth in order to provide a thorough understanding of exemplary embodiments or other examples described herein. However, these embodiments and examples may be practiced without the specific details. In other instances, well-known methods, procedures, components, and/or circuits have not been described in detail, so as not to obscure the following description. Further, the embodiments disclosed are for exemplary purposes only and other embodiments may be employed in lieu of, or in combination with, the embodiments disclosed. For example, although embodiments of the present principles are described with respect to the implementation of VMware software for implementing various aspects of the present principles, other applications, such as Microsoft Azure or Hyper-V, can be implemented in accordance with various embodiments of the present principles.

Embodiments of the present principles provide methods, apparatuses and systems for providing a cloud-based disaster recovery test of at least a portion of a client data network(s) without in any way interfering with or interrupting a client's production data network machine(s) or production data.

Exemplary definitions are provided below to assist in understanding the embodiments of the present principles.

A backup, or the process of backing up, can refer to the copying and/or archiving of computer data so the copied data can be used to restore the original after a data loss event.

Cloud computing can refer to computing that can involve a large number of computers connected through a communication network such as the Internet. Cloud computing can be a form of distributed computing over a network, and can include the ability to run a program or application on many connected computers at the same time.

Cloud storage can refer to a model of networked enterprise storage where data is stored in virtualized pools of storage which are generally hosted by third parties. Hosting companies can operate large data centers, and users can have data hosted by leasing storage capacity from said hosting companies. Physically, the resource can span across multiple servers and multiple locations.

Reservation can refer to a degree to which a cloud-computing system is able to adapt to workload changes by provisioning and de-provisioning resources in an autonomic manner, such that at each point in time the available resources match the current demand as closely as possible.

Disaster Recovery as a service (DRaaS) can refer to the use of physical machines, virtual machines, and/or other resources to perform disaster recovery offered with a cloud-service model.

Virtual machine (VM) can refer to a software-based emulation of a computer. Virtual machines can operate based on the computer architecture and functions of a computer.

Workload as used herein can refer to groups of machines including, for example, servers, networks, firewalls, etc., and all other devices and interconnections between the groups of machines of a client site or sites.

FIG. 1 depicts a high level block diagram of a cloud-based disaster recovery and data backup system 100 for providing a cloud-based disaster recovery test in accordance with embodiments of the present principles. The cloud-based disaster recovery and data backup system 100 of FIG. 1 illustratively comprises a client domain 110, at least one computer network 120 and a cloud-based computing platform 130. In the embodiment of FIG. 1, the client domain 110 includes at least one client machine 112A-1120 (collectively client machines 112), a local storage means 115 and an onsite client server 114. In the embodiment of FIG. 1, the collection of client machines 112 of the client domain 110 are intended to be representative of a client data network 116. The client data network 116 of FIG. 1 illustratively includes a representation of a virtual machine 136 of the cloud-based computing platform 130. That is, as depicted in FIG. 1, the client data network 116 can include a virtual machine 136 provided by and operating in the cloud-based computing platform 130 and remotely performing the functionality of at least a portion of the workload of the client data network 116.

In the embodiment of FIG. 1, the computer network 120 illustratively comprises at least one computer network such as a wide-area network (WAN), an Internet and other networks implemented for communication by the client domain 110. The cloud-based computing platform 130 of FIG. 1 illustratively includes a cloud-based storage means 132, at least one cloud-based server 134 and a virtual data network 137. As described above, the cloud-based computing platform 130 can optionally include at least one virtual machine 136 representative of virtualized client workloads of, for example, the client data network 116. The at least one virtual machine 136 remotely performs the functionality of workloads of the client data network 116 selected by the client to be performed in the cloud-based computing platform 130. In the embodiment of FIG. 1, the client server 114 and the cloud-based server 134 illustratively include respective data handlers/media agents 113, 133, which will be described in greater detail below.

Although in FIG. 1, the cloud-based server 134 is depicted as a physical device, in various embodiments in accordance with the present principles, the cloud-based server 134 of FIG. 1 is intended to be representative of applications and servers for implementing the various aspects of the present principles. For example, in one embodiment in which VMware is implemented, the cloud-based server 134 of FIG. 1 can include at least one of a data handler, a host machine, a vCenter Server to manage installations and handle inventory of objects, a VMware vCenter server, which is a centralized management application that enables a client to manage virtual machines and ESXi hosts centrally, a vSphere client, used to access a vCenter Server and ultimately manage ESXi servers, a VMware vSphere application which includes a VMware ESX/ESXi hypervisor that functions as the virtualization server and any other application or server necessary for implementing the processes of the present principles as described herein.

Additionally, although in FIG. 1, the virtual machine 136 is depicted as a single, physical device, in various embodiments in accordance with the present principles, the virtual machine 136 of FIG. 1 is intended to represent a virtualized workload of a client, for example of a client data network 116, as described in greater detail below, and in some embodiments can exist in the cloud-based storage means 132. Similarly, although in FIG. 1, the virtual data network 137 is depicted as a single, physical device, in various embodiments in accordance with the present principles, the virtual data network 137 of FIG. 1 is intended to represent a virtualized workload of a client data network, for example of the client data network 116, as described in greater detail below, and in some embodiments can exist in the cloud-based storage means 132.

Even further, although in FIG. 1, the client machines 112 are depicted as a separate, physical devices, in various embodiments in accordance with the present principles, the client machines 112, and, in some embodiments, the virtual machine 136 of FIG. 1, collectively, are intended to represent the workload of the client data network 116 including servers, networks, firewalls, etc., and all other machines and interconnections of client data network(s) 116. In addition, although in FIG. 1, the cloud-based storage means 132 is depicted as a single, physical device, in various embodiments in accordance with the present principles, the cloud-based storage means 132 is intended to represent cloud storage which can span multiple servers and can be accessed by clients over the internet.

In the cloud-based disaster recovery and data backup system 100 of FIG. 1, data backup services are provided by generating a first copy of the data of the client machines 112, 136 of the client's data network 116 under the control of, for example, a data handler/media agent 113 of the client server 114 of FIG. 1. The first copy of the data is communicated to the local storage means 115 for storage. By having a local copy of the data of the client machines 112, 136 of the client's data network 116, faster backup and restore/recovery can be provided for the data of the client's data network 116. However, local storage capacity can be limited and the security of the data at the client domain 110 can also be an issue should the client domain 110 experience a failure.

As such, in the embodiment of FIG. 1, a second copy of the data of the client machines 112, 136 of the client's data network 116 can be communicated over the internet 120 to the cloud-based computing platform 130. In such embodiments, the data handler/media agent 113 of the client server 114 can direct that a second copy of the data of the client machines 112, 136 of the client's data network 116 be communicated over the internet to the cloud-based computing platform 130. At the cloud-based computing platform 130, a data handler, for example the media agent 133 of the cloud-based server 134, can direct that the second copy of the data of the client machines 112, 136 of the client's data network 116 be stored in the cloud-based computing platform 130, for example, in the cloud-based storage means 132. Therefore, when a failure occurs at the client domain 110, the first copy of the data stored at the local storage means 115 or the second copy of the data stored in the cloud-based computing platform 130, for example, in the cloud-based storage means 132, can be used to provide recovery of a failed workload of, for example, the client's data network 116.

In one embodiment in accordance with the present principles, a client in the client domain 110 can interact via a user interface (not shown) of, for example, the client server 114 through the computer network 120 with a web-based application of the present principles stored and executed via, for example, the at least one cloud-based server 134 of the cloud-based computing platform 130. For example, in one embodiment in which VMware is implemented, VMware vSphere Web Client is implemented as a web-based application to connect a client to the cloud-based server 134 (i.e., in one embodiment a vCenter Server) to provide information and manage created workloads.

Using the user interface and the web-based application, a client can communicate to the at least one cloud-based server 134 of the cloud-based computing platform 130, the details of the workload (e.g., machine(s) and configurations) of the client data network 116 of the client domain 110 including any virtual machine(s) 136 in the cloud computing platform 130 performing functionalities of the client data network 116. That is, a client communicates to the at least one cloud-based server 134 of the cloud-based computing platform 130 the details of the servers, networks, firewalls, etc., and all other machines and interconnections (e.g., the workload) of a client data network of a client domain or domains 110. In some embodiments in accordance with the present principles, a client provides information regarding all possible configurations for the machines of the client data network 116 for later use in, for example, cloning the machine(s) and configurations of at least portions of the client data network 116 for providing a virtual client data network 137 in the cloud computing platform 130 (described in great detail below).

Subsequent to the workload information being uploaded to the cloud-based computing platform 130, a client can communicate, in at least some embodiments, via the user interface and the web-based application and over the computer network 120 to the at least one cloud-based server 134 of the cloud-based computing platform 130, a communication indicative of a desire to perform a disaster recovery test.

In some embodiments in accordance with the present principles, a client identifies the workloads (e.g., machine(s) and configurations) of at least a portion of a data network to be included in a disaster recovery test in a separate communication or with the communication indicative of the client's desire to perform a disaster recovery test.

After the client workloads of the client data network 116 to be included in the disaster recovery test are identified by a respective client, using for example the user interface and the web-based application, the identified workloads are virtualized in the cloud-computing platform 130 and made available for use by the client as an isolated virtual data network to perform a disaster recover test in accordance with a process of the present principles and as described below.

Figure 2:
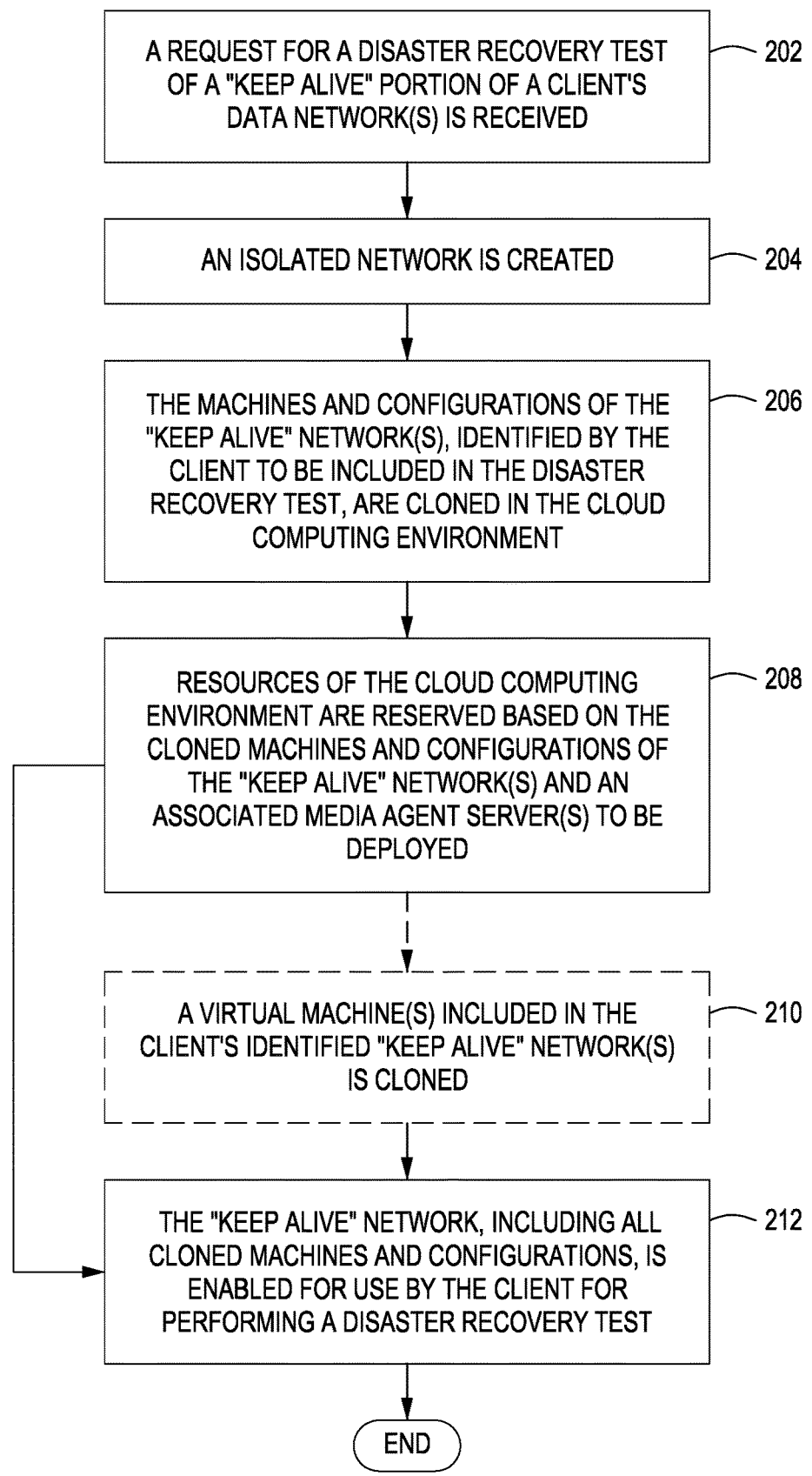
FIG. 2 depicts a flow diagram of a method 200 for providing a disaster recovery test in accordance with an embodiment of the present principles.

FIG. 2 depicts a flow diagram of a method 200 for providing a disaster recovery test in accordance with an embodiment of the present principles. The method 200 of FIG. 2 begins at 202 during which a request for a disaster recovery test of at least a portion of a client's data network 116 is received. In one embodiment, in which VMware is implemented, the request is received from a remote client by an SCM local to the cloud-based computing platform 130. As described above, in some embodiments the request can be received from a client using an interface device and a web application of the present principles to identify/select client workloads to be included in the disaster recovery test. In some embodiments in accordance with the present principles, along with the request and the identification of workloads (e.g., machine(s) and configurations) to be included in the disaster recovery test, a client can identify a recovery point for the disaster recovery test to be performed. Alternatively or in addition, a client does not provide the recovery point information for the disaster recovery test until the requesting client is informed that the isolated virtual data network is ready for use by the client for performing a disaster recovery test. The method 200 can proceed to 204.

At 204, an isolated network is created. That is, an isolated network is created within which all virtual machines and network(s) will be created and will operate such that virtual machines and networks created within the isolated test environment do not interact with or communicate with or interrupt in any way a client's production environment or production data. In some embodiments in which VMware is being implemented, an isolated network is created in NSX for implementing the disaster recovery test including machines and configurations identified by the client as "keep alive" network(s) for performing the disaster recovery test of at least a portion of the client's data network. The created isolated network can sometimes be referred to as a "bubble". The method 200 can proceed to 206.

At 206, the machine(s) and configurations of the "keep alive" network(s), identified by the client to be included in the disaster recovery test, are cloned in the cloud-based computing platform 130. The client's "keep alive" network (s) can be cloned using configuration information of machine(s) and configurations of the identified "keep alive" network(s) previously provided by the client as described above. The table in FIG. 3 provides examples of machines and associated configuration information of an identified "keep alive" network(s) to be included in a disaster recovery test which can be provided for cloning the machines and configurations. As depicted in FIG. 3, machine(s) that can be cloned and included in a disaster recovery test can include an edge service gateway, a distributed logical router, an ESG to DLR logical switch, a virtual machine logical switch, uplink private IP and uplink public IP, and SSL VPN, to name a few. FIG. 3 provides examples of machine(s) and configuration information of the machine(s) to be cloned and should not be considered a complete listing. Other machine(s) can be cloned and other configuration information can be provided to clone machine(s) of a client's "keep alive" network(s) (e.g., workloads) to be included in a disaster recovery test in accordance with the present principles.

In embodiments in accordance with the present principles in which VMware is implemented, upon receiving a request for a disaster recovery test from a client, SCM triggers a vRO workflow to clone the identified "keep alive" network(s) in NSX. The SCM passes all required inputs to vRO workflows to clone the required components. In instances in which the SCM does not have all of the required information, the SCM can provide a REST API so that vRO can obtain the missing, required information, for example, by in one embodiment requesting such information from the client via, for example, the web application and a user interface of the client server 114.

Figure 4:
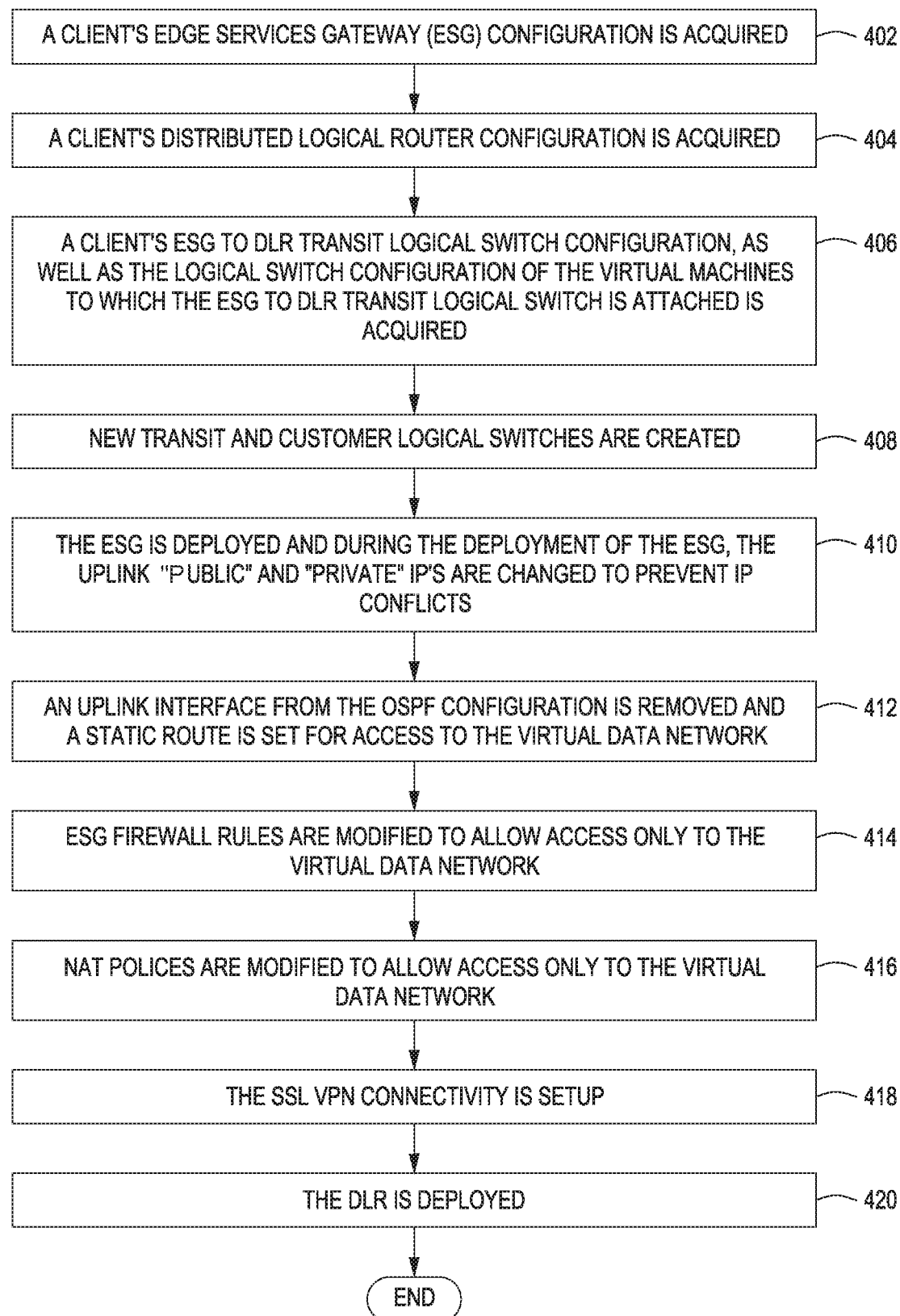
FIG. 4 depicts a flow diagram of a method for cloning machine(s) of a client's "keep alive" network in accordance with an embodiment of the present principles.

FIG. 4 depicts a flow diagram of a method 400 for cloning machine(s) of a client's "keep alive" network for creating a virtual data network 137 for providing a disaster recovery test environment in accordance with an embodiment of the present principles. The method 400 of FIG. 4 begins at 402 during which a client's Edge Services Gateway (ESG) configuration can be acquired. The method 400 can proceed to 404.

At 404, a client's Distributed Logical Router configuration can be acquired. The method 400 can proceed to 406.

At 406, a client's ESG to DLR transit Logical Switch (LS) configuration, as well as the Logical Switch configuration of the virtual machines to which the ESG to DLR transit Logical Switch is attached can be acquired. The method 400 can proceed to 408.

At 408, new transit and customer logical switches are created. In various embodiments, the transit and logical switches are deployed before the ESG and DLR as the transit and logical switches are used during configuration of the ESG and DLR devices. The method 400 can proceed to 410.

At 410, the ESG can be deployed. During the deployment of the ESG, the uplink "Public" and "Private" IP's can be changed to prevent IP conflicts. In various embodiments, the internal IP of the ESG going to the DLR can remain the same. The method 400 can proceed to 412.

At 412, the Uplink interface from the OSPF configuration is removed and a static route is set for access to the virtual data network 137. The method 400 can proceed to 414.

At 414, the ESG firewall rules are modified to allow access only to the virtual data network 137. The method 400 can proceed to 416.

At 416, NAT polices are modified to only allow access to the isolated virtual data network 137. The method 400 can proceed to 418.

At 418, the SSL VPN connectivity is setup. The SSL VPN connectivity can be pulled from the existing ESG configuration, however the external interface IP is modified to represent the new public IP. The method 400 can proceed to 420.

At 420, the DLR is deployed. In various embodiment in accordance with the present principles, during the deployment, the Uplink and Internal connections are made to the newly created Logical Switches. The method 400 can be exited.

Referring back to the method 200, after the "keep alive" network(s) identified by the client to be included in the disaster recovery test is cloned, the method 200 can proceed to 208. At 208, a reservation is made for the machine(s) and configuration of the cloned "keep alive" network(s). That is, after the machine(s) and configuration identified by the client to be included in the disaster recovery test (i.e., the client's "keep alive" network(s)) are cloned, cloud resources (e.g., processing and memory resources) necessary for implementing the machines and configuration of the cloned "keep alive" network(s) are reserved as a host environment. In addition to creating a reservation for the "keep alive" network(s), in some embodiments in accordance with the present principles, resources for deploying a media agent server(s) for performing the disaster recovery test in the isolated virtual data network 137 are also reserved. That is, in some embodiments, a reservation for the cloned "keep alive" network(s) includes a reservation for media agent server(s) to be deployed.

In some embodiments in accordance with the present principles in which VMware is implemented, a reservation is created in vRA based on the restoration requirements provided by SCM. More specifically, when implementing VMware, all restoration requirements and metadata that is required to create the Reservation is obtained via the vRA REST API. The Reservation is created by making a POST request to the vRA REST API with the necessary JSON data. In such embodiments, the vRA Service Account must be a fabric group administrator to create Reservations using vRA's REST API. The method 200 can proceed to 210 if the client's identified "keep alive" network(s) includes at least one virtual machine 136, for example, resident in the cloud-based computing platform 130. Otherwise, the method 200 can proceed to 212.

At 210, a virtual machine(s) included in the client's identified "keep alive" network(s) is cloned. In embodiments in accordance with the present principles in which VMware is implemented, the virtual machine(s) to be included in the client's identified "keep alive" network(s) is cloned by identifying an OS running on a respective virtual machine and identifying a number of networks the virtual machine is using. An out-of-box vRO workflow is implemented to clone a respective virtual machine depending on the identified OS and number of networks. For example, FIGS. 6A and 6B depict a table providing examples of types of information that can be provided for cloning a respective virtual machine(s) included in a client's identified "keep alive" network(s). As depicted in FIGS. 6A and 6B, some of the information can include names and/or the id of a virtual machine to be cloned, names and/or the id to be given to a virtual machine to be cloned, the name of the OS running on the virtual machine, names of the hosts on which the cloned virtual machine will be placed, the MAC address of a network adapter of the virtual machine to be cloned, the network that will attach to a virtual network interface, a fixed, valid IP address that is to be assigned to the Virtual Network Adapter for the virtual machine to be cloned, and a list of network gateways to be used, to name a few. FIGS. 6A and 6B provide examples of information that can be provided to clone a virtual machine and should not be considered a complete listing. Other information can be needed to clone a virtual machine(s) in the client's identified "keep alive" network(s) to be included in a disaster recovery test in accordance with the present principles. The method 200 can proceed to 212.

At 212, the cloned "keep alive" network(s) including any cloned machine(s), virtual machine(s) 136 and configuration to be included in a disaster recovery test are made available for use by the client requesting the disaster recovery test. For example, in the embodiment of FIG. 1, the cloned "keep alive" network(s) including any cloned machine(s), virtual machine(s) 136 and configuration to be included in a disaster recovery test are identified as a virtual data network 137. In embodiments in which VMware is implemented, an out-of-Box vCenter Workflow, "Import vCenter Virtual Machine", can be used to move the cloned machine(s) from the vCenter to the vRA for access by a respective client(s).

In some embodiments in accordance with the present principles, before moving the cloned machine(s) from the vCenter to the vRA, at least some of the cloned machine(s) are renamed, tagged and associated with a respective client folder. For example, in embodiments in which VMware is implemented, SCM triggers a vRO workflow to rename at least some of the cloned machine(s). That is, a cloned machine(s) can be renamed to ensure that there are unique names for all of the cloned machine(s) created in the cloud-based computing platform 130. In such embodiments, respective information for a cloned machine(s) can be obtained from SCM and an out-of-Box vRO Workflow, "Rename Machine", can be used to rename the cloned machine(s).

As described above, in some embodiments in accordance with the present principles, at least one of the cloned machine(s) 136 can be tagged with identification information of the original client machine for which a respective cloned machine(s) was created for identification purposes by, for example, a respective client. In embodiments in which VMware is implemented, an out-of-Box vRO Workflow, "Associate vSphere Tag with VM", can be used to tag the cloned machine(s) with respective information.

As described above, in some embodiments in accordance with the present principles, at least one of the cloned machine(s) can be associated with an appropriate client folder in the cloud-based computing platform 130. In embodiments in which VMware is implemented, an out-of-Box vRO Workflow, "Move VMs to Folder", can be used to move/associate the cloned machine(s) with a respective client folder. The cloned machine(s) can then be moved from the vCenter to the vRA.

FIG. 7A depict tables providing examples of inputs and information required for renaming, tagging, moving to a folder and importing a cloned machine(s) into vRA and a source of the inputs and information in accordance with an embodiment of the present principles. For example and as depicted in FIG. 7A, to rename a cloned machine(s), a string including the name of the virtual machine to be renamed and a string including a new name for the virtual machine must be provided. In addition and as also depicted in FIG. 7A, to move a cloned machine(s) to a client folder, an array or string containing the name(s) or vmid(s) of the virtual machines to be moved must be provided and a name of the client folder(s) to which to move the virtual machine(s) must be provided.

FIG. 7B depicts a table providing examples of inputs and information required for importing a virtual machine to a vRA and a source of the inputs and information in accordance with an embodiment of the present principles. As depicted in FIG. 7B, to import the cloned machine(s) from the vCenter to the vRA, at least some of the following must be provided: the name or vmid of the virtual machine(s) that will be imported from vCenter into vRA, the vRA instance to which the virtual machine(s) will be imported, the name of the Reservation under which the virtual machine(s) will be imported, the vRA Username of the user to which the virtual machine(s) will be assigned once the virtual machine has been imported into vRA, the name of the Composite Blueprint under which the virtual machine will be imported and the name to be given to the imported virtual machine must be provided. FIGS. 7A and 7B provide examples of information provided by the client and should not be considered a complete listing. Other information may need to be provided to make available the cloned machine(s) to a client in accordance with the present principles. FIGS. 7A and 7B provide examples of information provided by the client and should not be considered a complete listing. Other information may need to be provided by a client in accordance with the present principles.

In some embodiments, to further enable the virtual data network 137, which includes the cloned "keep alive" network(s) including any cloned virtual machine(s) 136, for use by the client, the cloned machines are "powered on". In embodiments in which VMware is implemented, an out-of-Box vRO Workflow, "Power on Virtual Machine and Wait", can be used to power on the cloned machine(s). In some embodiments, if needed, a client can provide an order in which the cloned machines must be powered on, which will be executed as such by the out-of-Box vRO Workflow, "Power on Virtual Machine and Wait".

After the cloned machine(s) of the virtual data network 137 are powered on, a media agent server can be provisioned for the virtual data network 137. In various embodiments, the media agent server is provisioned using a blueprint detailing the transmission of data. In embodiments implementing VMware, an Out-Of-Box vRO workflow "Request a Catalog Item" can be used to deploy the media agent server(s) from a published blueprint existing in the vRA. Media agent software can then be installed for the virtual data network 137. In embodiments implementing VMware, Puppet installs media agent software and provides a REST API that enables vRO to know when the software is finished installing.

A client can then be notified that the virtual data network 137 is available for performing a disaster recovery test. In embodiments in which VMware is implemented, after the virtual data network 137 is enabled for use by a client, an SCM status view is updated to reflect the ready status. Subsequently, a client can be notified of the ready status via, for example, the web-based application and user interface as described above. The method 200 can then be exited.

A client is then able to use a user interface and the web-based application program of the present principles to identify at least a recovery point at which to perform the disaster recovery test in the virtual data network 137 of the cloud-based computing platform 130. That is, in some embodiments, method 200 can further include receiving, for example, from the client requesting the disaster recovery test, an indication of a recovery point at which to perform the cloud-based disaster recovery test. In response to receiving the indication of the recovery point, method 200 can further include retrieving data (i.e., taking a snapshot) associated with the cloned machines during the recovery point from a storage means having a backup copy of such data, such as the storage means 115 or 132, and provisioning the cloned machines with the retrieved data for performing the cloud-based disaster recovery test in the virtual data network 137 of the cloud-based computing platform 130.

In some embodiments in accordance with the present principles, the indication of the recovery point at which to perform the cloud-based disaster recovery test is received with the request for the disaster recovery test. In some of such embodiments, the machines can be cloned to reflect respective configurations at the recovery point.

In some alternate embodiments in accordance with the present principles, the indication of the recovery point at which to perform the cloud-based disaster recovery test is received from a client requesting the disaster recovery test after the cloned machines are enabled for use by the client for performing the cloud-based disaster recovery test in the virtual data network 137 of the cloud-based computing platform 130.

In accordance with the present principles, the disaster recovery test takes place entirely in the virtual data network 137 without interfering with or interrupting a client's production data network or production data.

Figure 5:
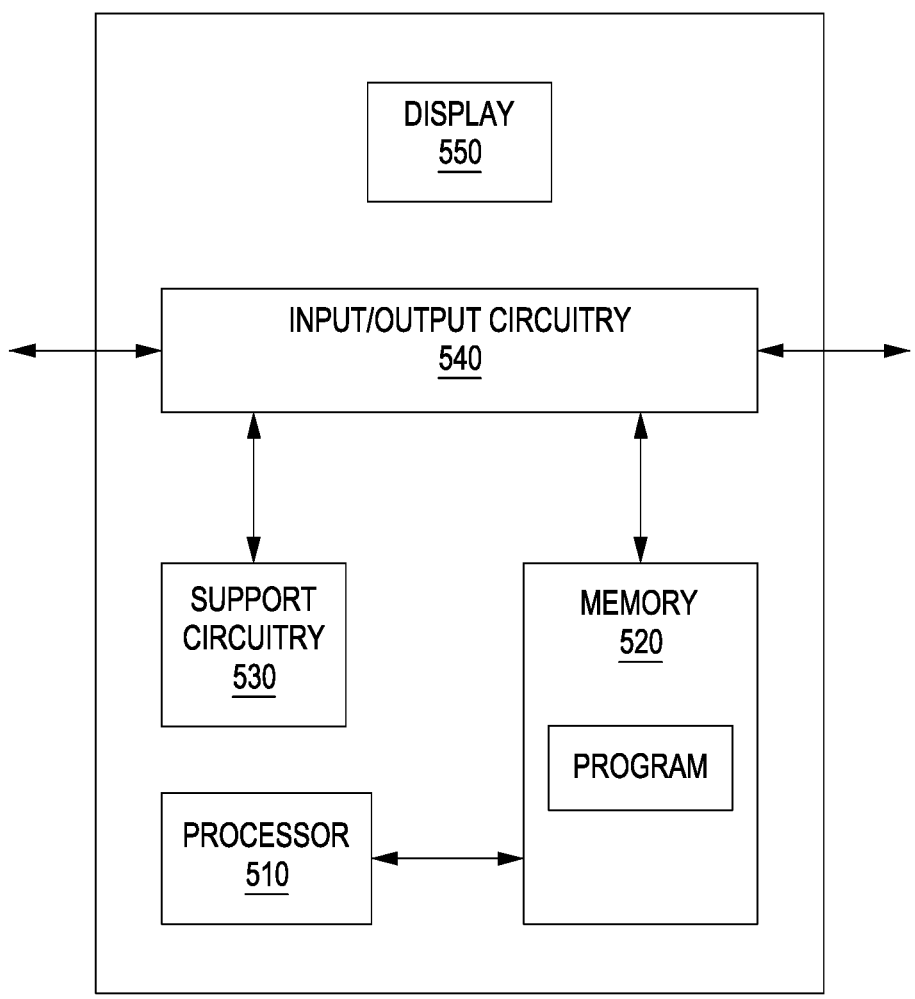
FIG. 5 depicts computing system with a number of components that may be used to perform any of the processes described herein in accordance with an embodiment of the present principles.

FIG. 5 depicts computing system 500 capable of performing the above described functions and processes of a server, such as the client server 114 and/or the cloud-based server 134, in accordance with an embodiment of the present principles. The computing system 500 of FIG. 5 illustratively comprises a processor 510, which can include one or more central processing units (CPU), as well as a memory 520 for storing control programs, configuration information, backup data and the like. The processor 510 cooperates with support circuitry 530 such as power supplies, clock circuits, cache memory and the like as well as circuits that assist in executing the software routines/programs stored in the memory 520. As such, some of the process steps discussed herein as software processes may be implemented within hardware, for example, as circuitry that cooperates with the processor 510 to perform various steps. The computing system 500 also contains an input-output circuitry and interface 540 that forms an interface between the various functional elements communicating with the computing system 500. For example, in some embodiments the input-output circuitry and interface 540 can include or be connected to an optional display 550, a keyboard and/or other user input (not shown). The input-output circuitry and interface 540 can be implemented as a user interface for interaction with the computing system 500.

The computing system 500 can communicate with other computing devices based on various computer communication protocols such a Wi-Fi, Bluetooth® (and/or other standards for exchanging data over short distances includes protocols using short-wavelength radio transmissions), USB, Ethernet, cellular, an ultrasonic local area communication protocol, etc. The computing system 500 can further include a web browser.

Although the computing system 500 of FIG. 5 is depicted as a general purpose computer, the computing system 500 is programmed to perform various specialized control functions in accordance with the present principles and embodiments can be implemented in hardware, for example, as an application specified integrated circuit (ASIC). As such, the process steps described herein are intended to be broadly interpreted as being equivalently performed by software, hardware, or a combination thereof.

While the foregoing is directed to embodiments of the present principles, other and further embodiments may be devised without departing from the basic scope thereof. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

The invention claimed is:

1. A method for providing a cloud-based disaster recovery test, comprising:
receiving, at a cloud-based computing platform, a request for a disaster recovery test of at least a portion of a client's data network with an indication of a recovery point at which to perform the cloud-based disaster recovery test;
in response to the received request and indication:
creating an isolated network in the cloud-based computing platform;
cloning, in the isolated network, machines and configurations of the at least the portion of the client's data network to be included in the cloud-based disaster recovery test, wherein the machines are cloned to reflect respective configurations at the recovery point;
retrieving data associated with the cloned machines at the recovery point from a storage means having a backup copy of such data;
provisioning the cloned machines with the retrieved data for performing the cloud-based disaster recovery test in the cloud-based computing platform;
reserving resources of the cloud-based computing platform based on the cloned machines and configurations of the at least the portion of the client's data network and an associated data handler to be deployed in the cloud-based disaster recovery test; and
enabling the cloned machines for use by the client for performing the cloud-based disaster recovery test in the cloud-based computing platform.

2. The method of claim 1, wherein an identification of which portion of a client's data network is to be included in the cloud-based disaster recovery test is received with the request for the disaster recovery test.

3. The method of claim 1, further comprising cloning, in the isolated network, virtual machines of the at least the portion of the client's data network to be included in the cloud-based disaster recovery test and enabling all cloned virtual machines as a virtual data network in the cloud-based computing platform for use by the client for performing the cloud-based disaster recovery test.

4. The method of claim 1, wherein the indication of the recovery point at which to perform the cloud-based disaster recovery test is received from a client requesting the disaster recovery test.

5. The method of claim 1, wherein enabling the cloned machines for use by the client for performing the cloud-based disaster recovery test, comprises at least one of:
renaming the cloned machines;
tagging the cloned machines;
associating the cloned machines with the client requesting the disaster recovery test;
moving the cloned machines to a folder accessible by the client requesting the disaster recovery test;
powering-on the cloned machines;
deploying the at least one data handler;
installing software for the data handler; or
notifying the client requesting the disaster recovery test that the cloned machines are ready for use by the client for performing the cloud-based disaster recovery test in the cloud-based computing platform.

6. The method of claim 1, wherein the machines and configurations of the at least the portion of the client's data network to be included in the cloud-based disaster recovery test are cloned using configuration information previously provided by a client using a web-based application.

7. The method of claim 1, comprising:
providing data handler software for managing data transmissions in the isolated network in the cloud-based computing platform and a web-based application for communicating with clients.

8. A cloud-based server of a cloud-based computing platform for providing a cloud-based disaster recovery test, comprising:
a processor; and
a memory coupled to the processor, the memory having stored therein at least one of programs or instructions executable by the processor to configure the cloud-based server to:
receive, at a cloud-based computing platform, a request for a disaster recovery test of at least a portion of a client's data network and an indication of a recovery point at which to perform the cloud-based disaster recovery test;
in response to the received request and indication:
create an isolated network in the cloud-based computing platform;
clone, in the isolated network, machines and configurations of the at least the portion of the client's data network to be included in the cloud-based disaster recovery test;
retrieve data associated with the cloned machines at the recovery point from a storage means having a backup copy of such data;
provision the cloned machines with the retrieved data for performing the cloud-based disaster recovery test in the cloud-based computing platform;
reserve resources of the cloud-based computing platform based on the cloned machines and configurations of the at least the portion of the client's data network and an associated data handler to be deployed in the cloud-based disaster recovery test; and
enable the cloned machines for use by the client for performing the cloud-based disaster recovery test in the cloud-based computing platform
wherein the indication of the recovery point at which to perform the cloud-based disaster recovery test is received from a client requesting the disaster recovery test after the cloned machines are enabled for use by the client for performing the cloud-based disaster recovery test in the cloud-based computing platform.

9. The cloud-based server of claim 8, wherein an identification of which portion of a client's data network is to be included in the cloud-based disaster recovery test is received with the request for the disaster recovery test.

10. The cloud-based server of claim 8, wherein the cloud-based server is further configured to clone, in the isolated network, virtual machines of the at least the portion of the client's data network to be included in the cloud-based disaster recovery test and enable all cloned virtual machines as a virtual data network in the cloud-based computing platform for use by the client for performing the cloud-based disaster recovery test.

11. The cloud-based server of claim 8, wherein the cloud-based server enables the cloned machines for use by the client for performing the cloud-based disaster recovery test, by at least one of:
renaming the cloned machines;
tagging the cloned machines;
associating the cloned machines with the client requesting the disaster recovery test;
moving the cloned machines to a folder accessible by the client requesting the disaster recovery test;
powering-on the cloned machines;
deploying the at least one data handler;
installing software for the data handler; or
notifying the client requesting the disaster recovery test that the cloned machines are ready for use by the client for performing the cloud-based disaster recovery test in the cloud-based computing platform.

12. The cloud-based server of claim 8, wherein the cloud-based server comprises data handler software for managing data transmissions in the isolated network in the cloud-based computing platform and a web-based application for communicating with clients.

13. The cloud-based server of claim 12, wherein the machines and configurations of the at least the portion of the client's data network to be included in the cloud-based disaster recovery test are cloned using configuration information previously provided by a client using the web-based application.

14. A cloud-based computing platform for providing a cloud-based disaster recovery test, comprising:
a storage device to store at least one of backup data or configuration information; and
a cloud-based server, comprising:
a processor; and
a memory coupled to the processor, the memory having stored therein at least one of programs or instructions executable by the processor to configure the cloud-based server to:
receive, at a cloud-based computing platform, a request for a disaster recovery test of at least a portion of a client's data network with an indication of a recovery point at which to perform the cloud-based disaster recovery test;
in response to the received request and indication:
create an isolated network in the cloud-based computing platform;
clone, in the isolated network, machines and configurations of the at least the portion of the client's data network to be included in the cloud-based disaster recovery test, wherein the machines are cloned to reflect respective configurations at the recovery point;
retrieve data associated with the cloned machines at the recovery point from a storage means having a backup copy of such data;
provision the cloned machines with the retrieved data for performing the cloud-based disaster recovery test in the cloud-based computing platform;
reserve resources of the cloud-based computing platform based on the cloned machines and configurations of the at least the portion of the client's data network and an associated data handler to be deployed in the cloud-based disaster recovery test; and
enable the cloned machines for use by the client for performing the cloud-based disaster recovery test in the cloud-based computing platform.

15. The cloud-based computing platform of claim 14, wherein the enabled cloned machines in the isolated network comprise a virtual data network.

16. The cloud-based computing platform of claim 14, wherein the cloud-based server is further configured to clone, in the isolated network, virtual machines of the at least the portion of the client's data network to be included in the cloud-based disaster recovery test and enable all cloned virtual machines as a virtual data network in the cloud-based computing platform for use by the client for performing the cloud-based disaster recovery test.

17. The cloud-based computing platform of claim 14, wherein the cloud-based server comprises data handler software for managing data transmissions in the isolated network in the cloud-based computing platform and a web-based application for communicating with clients.

18. The cloud-based computing platform of claim 17, wherein the machines and configurations of the at least the portion of the client's data network to be included in the cloud-based disaster recovery test are cloned using configuration information previously provided by a client using the web-based application.

19. The cloud-based computing platform of claim 17, wherein the indication of the recovery point at which to perform the cloud-based disaster recovery test is received from a client requesting the disaster recovery test.

20. The cloud-based computing platform of claim 17, wherein an identification of which portion of a client's data network is to be included in the cloud-based disaster recovery test is received with the request for the disaster recovery test.

* * * * *